(12) United States Patent
Nodera et al.

(10) Patent No.: US 8,030,379 B2
(45) Date of Patent: Oct. 4, 2011

(54) POLYCARBONATE RESIN COMPOSITION AND MOLDED BODY

(75) Inventors: Akio Nodera, Chiba (JP); Yusuke Hayata, Chiba (JP); Yutaka Tsubokura, Chiba (JP); Yoshiaki Miura, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 335 days.

(21) Appl. No.: 11/720,935

(22) PCT Filed: Dec. 2, 2005

(86) PCT No.: PCT/JP2005/022154
§ 371 (c)(1),
(2), (4) Date: Jun. 6, 2007

(87) PCT Pub. No.: WO2006/062031
PCT Pub. Date: Jun. 15, 2006

(65) Prior Publication Data
US 2009/0239983 A1    Sep. 24, 2009

(30) Foreign Application Priority Data

Dec. 6, 2004  (JP) ................................. 2004-352723
Sep. 2, 2005  (JP) ................................. 2005-255122

(51) Int. Cl.
C08K 5/52     (2006.01)
C08K 5/526    (2006.01)
C08L 67/00    (2006.01)
C08G 63/08    (2006.01)
C08F 283/04   (2006.01)

(52) U.S. Cl. ........ 524/108; 524/140; 524/141; 524/147; 524/151; 525/413; 525/415; 525/450; 525/462

(58) Field of Classification Search ................. 525/413, 525/415, 150, 462, 464, 446, 450; 524/537, 524/858–869, 140–141, 108, 147, 151
See application file for complete search history.

(56) References Cited

U.S. PATENT DOCUMENTS

| | | | |
|---|---|---|---|
| 3,953,539 A * | 4/1976 | Kawase et al. | 524/116 |
| 5,451,632 A * | 9/1995 | Okumura et al. | 524/537 |
| 5,488,086 A * | 1/1996 | Umeda et al. | 525/92 A |
| 5,635,560 A * | 6/1997 | Kohler et al. | 525/67 |
| 5,847,011 A * | 12/1998 | Terado et al. | 521/48 |
| 7,067,186 B2 * | 6/2006 | Oguro et al. | 428/220 |
| 7,119,140 B2 * | 10/2006 | Basham et al. | 524/494 |
| 7,307,120 B2 * | 12/2007 | Nodera | 524/496 |
| 7,504,452 B2 * | 3/2009 | Hayata et al. | 524/462 |
| 2004/0178383 A1 * | 9/2004 | Kikuchi | 252/62 |
| 2004/0242803 A1 * | 12/2004 | Ohme et al. | 525/400 |

FOREIGN PATENT DOCUMENTS

| | | | | |
|---|---|---|---|---|
| JP | 07109413 | A * | 4/1995 | |
| JP | 09183893 | A * | 7/1997 | |
| JP | 2002 20610 | | 1/2002 | |
| JP | 2004 175831 | | 6/2004 | |
| JP | 2004161790 | A * | 6/2004 | |
| JP | 2004 190025 | | 7/2004 | |
| JP | 2004 190026 | | 7/2004 | |
| JP | 2005 008671 | | 1/2005 | |
| JP | 2005 048066 | | 2/2005 | |
| JP | 2005 048067 | | 2/2005 | |
| JP | 2005 060637 | | 3/2005 | |
| JP | 2005 320469 | | 11/2005 | |
| WO | WO 03064536 | A1 * | 8/2003 | |
| WO | WO 2005108489 | A1 * | 11/2005 | |

OTHER PUBLICATIONS

Machine Translated English language equivalent of JP 07109413.*
BASF (Terluran Specialties, 8 pages).*
Machine translated English equivalent of JP 2004-16170.*
JPO Abstract of JP 09183893 A (Jul. 1997).*
BASF (Terluran Specialties, 8 pages, Dec. 2000.*
Machine translated English equivalent of JP 07109413, Apr. 1995.*
U.S. Appl. No. 10/593,491, filed Sep. 20, 2006, Hayata et al.

* cited by examiner

*Primary Examiner* — Milton I Cano
*Assistant Examiner* — Brieann R Fink
(74) *Attorney, Agent, or Firm* — Oblon, Spivak, McClelland, Maier & Neustadt, L.L.P.

(57) ABSTRACT

Provided is a polycarbonate resin composition having high rigidity, high flowability, high heat resistance, and excellent flame retardancy and molded articles with good appearance using the polycarbonate resin composition. The polycarbonate resin composition comprises 4 to 50 parts by mass of a nonmetallic inorganic filler (B) and 0.01 to 1 part by mass of a phosphate compound (C) relative to 100 parts by mass of a resin mixture (A) which is composed of 60 to 97% by mass of an aromatic polycarbonate resin (a-1) and 40 to 3% by mass of a fatty acid polyester (a-2).

10 Claims, No Drawings

US 8,030,379 B2

POLYCARBONATE RESIN COMPOSITION AND MOLDED BODY

TECHNICAL FIELD

The present invention relates to a polycarbonate resin composition. It relates in more detail to a polycarbonate resin composition with high rigidity, high flowability and high heat resistance as well as excellent balance with flame retardancy.

Further, such polycarbonate resin composition can be applied to electric and electronic equipment such as office automation equipment, information and communication equipment, home appliances, and the like, the automotive field, the building, construction field and the like, and is particularly suitable for use as an enclosure or inner parts for the electric and electronic equipment.

BACKGROUND ART

Polycarbonate-polyester alloys are excellent in heat resistance and chemical resistance and particularly often used in automotive parts. In recent years, further thinning of the parts is demanded from a viewpoint of weight reduction, and improvement in the flowability of materials is requested. Further, higher rigidity, higher heat resistance and better flame retardancy of the materials are requested in response to the thinning of the products.

Polycarbonate-polylactic acid alloys, which belong to polycarbonate-polyester alloys not only have the above properties, but also enable to increase the flowability of polycarbonate (optionally abbreviated as PC hereinafter) due to the characteristics of high flowability that belongs to polylactic acid.

Also, when poly lactic acid is alloyed with polycarbonate and then burned, it is considered to release reduced amount of toxic gases because of its chemical structure so that environmentally friendly polycarbonate alloys can be expected.

Conventional PC-polyester alloys are superior in heat resistance and chemical resistance, but poor in flow ability, so that alloying with styrene type resins or addition of plasticizers is generally used in order to increase the flowability of PC resins (for example, refer to Patent document 1), PC-polylactic acid alloys having pearlescence, good flowability and good thermal and mechanical properties have been known, yet further improvement in flowability is required for molded articles with a complex shape like office automation equipment, and the like (for example, refer to Patent document 2). However, such alloys are poor in rigidity and low in flame retardancy, limiting applications of molded articles thereof.

Technologies to blend PC-thermoplastic polyester alloys with glass fibers have been also disclosed (for example, refer to Patent documents 3 and 4), however, they are only for aromatic polyesters, and none of those for fatty acid polyesters is described. Such technologies are good in improving rigidity, but insufficient in flowability and may reduce heat resistance.

While technologies to add inorganic fillers with an aspect ratio of 5 or more to fatty acid polyesters have been disclosed (for example, refer to Patent document 5), rigidity, heat resistance, flame retardancy and impact resistance are low, limiting applications of molded articles.

Further, a polycarbonate resin has self-extinguishing properties, however, in the field of electric and electronic equipment such as office automation equipment, information and communication equipment, home appliances and the like, there is a field in which a higher level of flame retardancy is demanded and the addition of various flame retardants is tried for its improvement.

Halogen type flame retardants such as halogenated bisphenol. A, halogenated polycarbonate oligomers and the like are used as a method to improve the flame retardancy of a polycarbonate resin in a combination with auxiliary flame retardants such as antimony oxide and the like in terms of flame retardant efficiency.

However, in recent years, the market demands a flame resisting method with halogen-free flame retardants from a viewpoint of safety and an effect on the environment in disposal and incineration.

Various methods are proposed, in which organophosphorus type flame retardants, particularly organophosphate ester compounds as halogen-free flame retardants show excellent flame retardancy and also serve as a plasticizer when blended to form a polycarbonate resin composition.

On the other hand, a technology to add both glass fibers and phosphorous type flame retardants to a resin comprising polylactic acid as a major component is also disclosed (for example, refer to Patent document 6), but it is required to add a large volume of such phosphate type flame retardants in order to impart flame retardancy, resulting in insufficient heat resistance, impact strength and water resistance. There is no disclosure on blending of PC with polylactic acid and on the effectiveness of phosphate type tire retardants to increase heat resistance and stability of the PC-polylactic acid alloys.

Patent document 1: Japanese Patent Application Publication No. H7 (1995)-68445
Patent document 2: Japanese Patent Application Laid-Open No. H7 (1995)-109413
Patent document 3: Japanese Patent Application Laid-Open No. S54 (1979)-94556
Patent document 4: Japanese Patent Application Laid-Open No. H6 (1994)-49344
Patent document 5: Japanese Patent Application Laid-Open No. 2002-105298
Patent document 6: Japanese Patent Application Laid-Open No. 2004-175831

DISCLOSURE OF THE INVENTION

Problems to be Solved by the Invention

The present invention has been initiated to address the above problems and has an object to provide a polycarbonate resin composition with high rigidity, high flowability, high heat resistance as well as excellent flame retardancy and molded articles with good appearance using said polycarbonate resin composition.

Means for Solving the Problems

The present inventors earnestly studied to solve the above problems and found that the above object can be achieved by a polycarbonate resin composition, wherein a nonmetallic inorganic filler and a phosphate compound are blended in a given proportion with a resin mixture comprising an aromatic polycarbonate resin and a fatty acid polyester in a particular ratio. The present invention is completed based on such findings.

That is, the present invention provides the following polycarbonate resin composition and molded articles thereof:

1. A polycarbonate resin composition comprising 4 to 50 parts by mass of a nonmetallic inorganic filler (B) and 0.01 to 1 part by mass of a phosphate compound (C) relative to 100 parts by mass of a resin mixture (A) which is composed of 60 to 97% by mass of an aromatic polycarbonate resin (a-1) and 40 to 3% by mass of a fatty acid polyester (a-2).

2. The polycarbonate resin composition described above in 1, wherein the aromatic polycarbonate resin of component (a-1) is a polycarbonate-polyorganosiloxane copolymer or an aromatic polycarbonate resin containing a polycarbonate-polyorganosiloxane copolymer.

3. The polycarbonate resin composition described above in 2, wherein the polycarbonate-polyorganosiloxane copolymer is a polycarbonate-polydimethylsiloxane copolymer having a chain length (n) of polydimethylsiloxane of 30 to 120.

4. The polycarbonate resin composition described above in 2 or 3, wherein the amount of polyorganosiloxane is 0.1 to 3.2% by mass in the resin mixture of component (A).

5. The polycarbonate resin composition described above in any of 1 to 4, wherein the fatty acid polyester of component (a-2) is polylactic acid and/or a copolymer of lactic acid homolog with other hydroxycarboxylic acid.

6. The polycarbonate resin composition described above in any of 1 to 5, wherein the nonmetallic inorganic filler of component (B) is at least one kind selected from glass fibers, glass flakes and carbon fibers.

7. The polycarbonate resin composition described above in any of 1 to 6, wherein the phosphate compound of component (C) is either a phosphite ester and/or a phosphate ester.

8. The polycarbonate resin composition described above in any of 1 to 7, used for enclosures or inner parts of electric and electronic equipment, 9. Molded articles comprising the polycarbonate resin composition described above in any of 1 to 8.

Effects of the Invention

Blending with a fatty acid polyester can provide a PC resin composition with very high flowability, high heat resistance and high rigidity as well as excellent flame retardancy and improves appearance of molded articles thereof. That is, blending with a nonmetallic inorganic filler improves rigidity as well as flame retardancy and heat resistance, and blending further with a small amount of a phosphate compound prevents reaction of PC with the fatty acid polyester and deterioration of the PC-fatty acid polyester alloy but does not lower heat resistance, thus yielding a PC resin composition with high flame retardancy and high mechanical strength. The PC resin composition of the present invention may be applied to thin-walled molded articles that require flame retardancy and heat resistance, large-sized molded articles and complex shaped molded articles.

Use of a polycarbonate-polyorganosiloxane copolymer also improves impact strength as well as flame retardancy.

BEST MODE FOR CARRYING OUT THE INVENTION

The aromatic PC resin of component (a-1) in component (A) in the PC resin composition of the present invention is an aromatic PC resin having a terminal group represented by general formula (1).

[Formula 1]

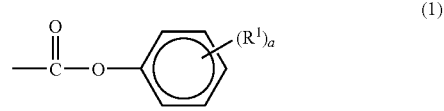

In general formula (1), $R^1$ is a $C_1$-$C_{35}$ alkyl group and may be linear or branched. $R^1$ may be bonded at p-, m- or o-position, and preferably at p-position. The symbol a represents an integer of 0 to 5. The viscosity average molecular weight of this aromatic PC resin is generally 10,000 to 40,000, preferably 13,000 to 30,000, more preferably 15,000 to 24,000 in terms of heat resistance, flame retardancy and impact strength.

The viscosity average molecular weight (Mv) is a value calculated by the formula $[\eta]=1.23\times10^{-5}$ $Mv^{0.83}$ after evaluation of the intrinsic viscosity $[\eta]$, which is obtained by measuring the viscosity of methylene chloride solutions at 20° C. with an Ubbelohde viscometer.

The aromatic polycarbonate having the terminal group represented by above general formula (1) can be readily manufactured by reacting a divalent phenol with phosgene or a carbonate ester compound. That is, for example, it is manufactured by reacting a divalent phenol with a carbonate precursor such as phosgene in the presence of a catalyst such as triethylamine and the like and a particular terminator in a solvent such as methylene chloride or by an ester exchange reaction of the divalent phenol with the carbonate precursor such as diphenyl carbonate or the like.

Here, the divalent phenol includes the compounds represented by following general formula (2).

[Formula 2]

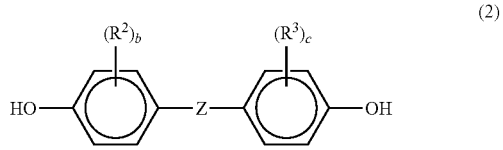

$R^2$ and $R^3$ each represent a $C_1$-$C_6$ alkyl group or a phenyl group and may be identical or different. Z represents a single bond, a $C_1$-$C_{20}$ alkyl group or a $C_2$-$C_{20}$ alkylidene group, a $C_5$-$C_{20}$ cycloalkylene group or a $C_5$-$C_{20}$ cycloalkylidene group or —$SO_2$—, —SO—, —S—, —O— or —CO— bond. Preferably, it is an isopropylidene group. The symbols b and c are an integer of 0 to 4, and preferably 0.

Divalent phenols represented by above general formula (2) include 4,4'-dihydroxydiphenyl, bis(4-hydroxyphenyl)alkanes such as 1,1-bis(4-hydroxyphenyl)methane, 1,1-bis(4-hydroxyphenyl)ethane, 2,2-bis(4-hydroxyphenyl)propane, and the like, bis(4-hydroxyphenyl)cycloalkanes, bis(4-hydroxyphenyl) oxide, bis(4-hydroxyphenyl) sulfide, bis(4-hydroxyphenyl) sulfone, bis(4-hydroxyphenyl)sulfoxide, bis (4-hydroxyphenyl) ketone, and the like. Among them, 2,2-bis (4-hydroxyphenyl)propane (bisphenol A) is preferred. These divalent phenols may be used singly or in a combination of two kinds or more.

Among the divalent phenols, either a single kind of them or two kinds or more of them may be used respectively for a homopolymer or a copolymer. Furthermore, a thermoplastic, random-branched polycarbonate may also be used, wherein the polycarbonate can be obtained by use of a multifunctional aromatic compound in combination with the above divalent phenols.

The carbonate ester compounds include diaryl carbonates such as diphenyl carbonate, and the like and dialkyl carbonates such as dimethyl carbonate, diethyl carbonate, and the like.

Phenol compounds capable of forming the terminal group represented by general formula (1), that is, phenol compounds represented by following formula (3) may be used as the terminator,

[Formula 3]

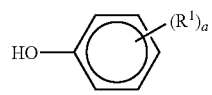
(3)

(wherein in the formula, $R^1$ represents a $C_1$-$C_{35}$ alkyl group and a represents an integer of 0 to 5).

The phenol compounds include phenol, p-cresol, p-tert-butylphenol, p-tert-octylphenol, p-cumylphenol, p-nonylphenol, docosylphenol, tetracosylphenol, hexacosylphenol, octacosylphenol, triacontylphenol, dotriacontylphenol, tetratriacontylphenol, p-tert-pentylphenol, and the like. These may be used singly or as a mixture of two kinds or more. These phenol compounds may be also used in combination with other phenol compounds as needed.

Aromatic polycarbonates manufactured by the above method substantially have the terminal group represented by above general formula (1) at one or both terminals.

In the present invention, the aromatic polycarbonate resin of above component (a-1) is preferably an aromatic polycarbonate-polyorganosiloxane copolymer (optionally abbreviated as aromatic PC-POS copolymer hereinafter) in terms of improving heat resistance, flame retardancy and impact strength. Aromatic PC-POS copolymers from such viewpoint preferably include a polycarbonate-polydimethylsiloxane copolymer, of which POS is polydimethylsiloxane having a chain length (n) of 30 to 120. The amount of polyorganosiloxane is preferably 0.1 to 3.2% by mass in the resin mixture of component (A).

The aromatic PC-POS copolymer has a terminal group represented by general formula (4),

[Formula 4]

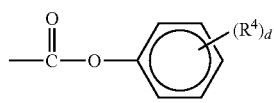
(4)

(wherein in the formula, $R^4$ represents a $C_1$-$C_{35}$ alkyl group and d represents an integer of 0 to 5).
and includes copolymers disclosed in Japanese Patent Application Laid-Open No. S50 (1975)-29695, Japanese Patent Application Laid-Open No. H3 (1991)-292359, Japanese Patent Application Laid-Open No. 114 (1992)-202465, Japanese Patent Application Laid-Open No. 118 (1996)-81620, Japanese Patent Application Laid-Open No. 118 (1996)-302178 and Japanese Patent Application Laid-Open No. H10 (1998)-7897. The $C_1$-$C_{35}$ alkyl group represented by $R^1$ may be linear or branched and is bonded at any of p-, m- and o-positions, preferably at p-position.

The aromatic PC-POS copolymer preferably includes a copolymer having a polycarbonate section composed of a structural unit represented by general formula (5) and a polyorganosiloxane section (segment) composed of a structural unit represented by general formula (6) in the molecule.

[Formula 5]

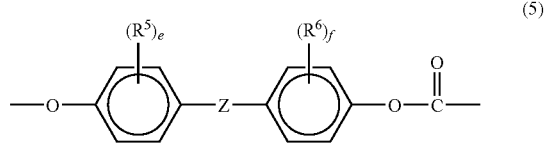
(5)

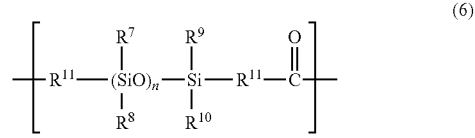
(6)

Here, $R^5$ and $R^6$ each represent a $C_1$-$C_6$ alkyl group or a phenyl group and may be identical or different. $R^7$ to $R^{10}$ each represent a $C_1$-$C_6$ alkyl group or a phenyl group and are preferably a methyl group. $R^7$ to $R^{10}$ each may be identical or different. $R^{11}$ represents a divalent organic residual group containing aliphatic or aromatic group and is preferably an o-allylphenol, p-hydroxystyrene or eugenol residual group.

Z represents a single bond, a $C_1$-$C_{20}$ alkylene group or a $C_2$-$C_{20}$ alkylidene group, $C_5$-$C_{20}$ cycloalkylene group or a $C_5$-$C_{20}$ cycloalkylidene group or —$SO_2$—, —SO—, —S—, —O— or —CO— bond. Preferably, it is an isopropylidene group. The symbols e and f each are an integer of 0 to 4, preferably 0. The symbol n is an integer of 1 to 500, preferably 5 to 200, more preferably 15 to 300, further more preferably 30 to 150.

The aromatic PC-POS copolymer can be manufactured, for example, by dissolving a polycarbonate oligomer (abbreviated as PC oligomer hereinafter) prepared in advance forming the polycarbonate section and a polyorganosiloxane (reactive PORS) having a reactive group such as an o-allylphenol, p-hydroxystyrene or eugenol residual group at the terminal forming the polyorganosiloxane section (segment) in a solvent such as methylene chloride, chlorobenzene, chloroform, and the like, to which a caustic alkali aqueous solution of a divalent phenol is added and a tertiary amine (triethylamine, and the like) or a quaternary ammonium salt (trimethylbenzyl ammonium chloride, and the like) is used as a catalyst and then by reacting via interfacial polycondensation in the presence of a general terminator comprising phenol compounds represented by general formula (7),

[Formula 6]

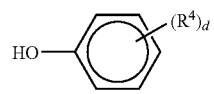
(7)

(wherein in the formula, $R^4$ represents a $C_1$-$C_{35}$ alkyl group and d represents an integer of 0 to 5).

Such phenol compounds include those similar to the illustrative compounds of above general formula (3). The amount of the above polyorganosiloxane section (segment) is preferably 0.2 to 10% by mass with respect to the aromatic PC-POS copolymer and 0.1 to 5% by mass of the PC resin composition of the present invention.

PC oligomers used in manufacture of the aromatic PC-POS copolymer can be readily manufactured, for example, by reacting a divalent phenol with a carbonate precursor such as phosgene, carbonate ester compounds or the like in a solvent such a methylene chloride. The divalent phenol used here includes those similar to the illustrative compounds above in general formula (2), and among them, 2,2-bis (4-hydroxyphenyl)propane (bisphenol A) is preferred.

The above PC oligomers can be manufactured, for example, by reacting a divalent phenol with a carbonate precursor such as phosgene in a solvent such as methylene chloride, and the like or by an ester exchange reaction of the divalent phenol with the carbonate precursor such as diphenyl carbonate.

Carbonate compounds also include diary 1 carbonates such as diphenyl carbonate, and the like and dialkyl carbonates such as dimethyl carbonate, diethyl carbonate, and the like.

The PC oligomers supplied in manufacture of the aromatic PC-POS copolymer may include a homopolymer using one kind of the above divalent phenols or a copolymer using two kinds or more of them. Furthermore, thermoplastic random-branched polycarbonates obtained by use of multifunctional aromatic compounds in combination with the above divalent phenols may be also used.

In such cases, branching agents (multifunctional aromatic compounds) used include 1,1,1-tris(4-hydroxyphenyl) ethane. $\alpha,\alpha',\alpha''$-tris(4-hydroxyphenyl)-1,3,5-triisoproylbenzene, 1[$\alpha$-methyl-$\alpha$-(4'-hydroxyphenyl)ethyl]-4-[$\alpha',\alpha'$-bis (4''-hydroxyphenyl)ethyl]benzene, phloroglucine, trimellitic acid, isatin bis(o-cresol), and the like.

The aromatic PC-POS copolymer can be manufactured as described above, but aromatic polycarbonates are generally formed as a by-product, resulting in manufacture of the aromatic polycarbonates containing the polycarbonate-polyorganosiloxane copolymer.

The aromatic PC-POS copolymer manufactured according to the above method substantially has an aromatic terminal group represented by above general formula (4) at one or both ends of the molecule.

In the PC resin composition of the present invention, the fatty acid polyesters of component (a-2) in component (A) used preferably include polylactic acid or a copolymer of a lactic acid homolog with hydroxycarboxylic acid.

Polylactic acid is generally synthesized by ring-opening polymerization of a cyclic dimer of lactic acid called lactide and a manufacturing method thereof is disclosed in U.S. Pat. No. 1,995,970, U.S. Pat. No. 2,362,511, U.S. Pat. No. 2,683,136 and others.

Also, copolymers of lactic acid with other hydroxycarboxylic acids are generally synthesized by ring-opening polymerization of lactide and a cyclic ester intermediate of the hydroxycarboxylic acid and a manufacturing method thereof is disclosed in U.S. Pat. No. 3,635,956, U.S. Pat. No. 3,797,499 and others.

When the lactic acid type resin is manufactured by direct dehydration and polycondensation instead of the ring-opening polymerization, a lactic acid homolog and other hydroxycarboxylic acid as needed are polymerized by azeotropic dehydration and condensation preferably in an organic solvent, particularly in the presence of a phenyl ether type solvent, and particularly preferably by returning the solvent to the reaction system, wherein the solvent is made substantially anhydrous by removing water by azeotropic distillation, thus yielding the lactic acid type resin with an appropriate degree of polymerization suitable for the present invention.

A lactic acid homolog used as a raw material may include L- and D-lactic acid, a mixture thereof or lactide that is a dimer of lactic acid.

Other hydroxycarboxylic acids, which can be used in conjunction with a lactic acid homolog may include glycolic acid, 3-hydroxybutyric acid, 4-hydroxybutyric acid, 4-hydroxyvaleric acid, 5-hydroxyvaleric acid, 6-hydroxycaproic acid and further cyclic ester intermediates of the hydroxycarboxylic acids, for example, glycolide that is a dimer of glycolic acid, $\epsilon$-caprolactone that is a cyclic ester of 6-hydroxycaproic acid.

Appropriate molecular-weight-modifiers, branching agents, other modifiers, and the like may be added in manufacture of the lactic acid type resin.

Further, lactic acid homolog and hydroxycarboxylic acids as a copolymer component may be also used singly or in a combination of two kinds or more and the lactic acid type resins obtained may be further used as a mixture of two kinds or more.

As the fatty acid polyester of component (a-2) used in the present invention, natural product derived polylactic acid is excellent in terms of flowability and thermal and mechanical properties and preferably has a large molecular weight, further preferably the weight average molecular weight of 30,000 or more.

In the resin mixture of component (A) in the present invention, a content ratio of the polycarbonate resin of component (a-1) to the fatty acid polyester of component (a-2) is in a range of 97:3 to 60:40 by mass ratio, preferably in a range of 95:5 to 50:50.

When the content ratio of component (a-1) and component (a-2) is within the above range, the PC resin composition of the present invention is good in mechanical strength, thermal stability and molding consistency.

The nonmetallic inorganic fillers of component (B) in the PC resin composition of the present invention are blended in order to provide high rigidity and good flame retardancy. The nonmetallic inorganic fillers used are preferably at least one kind chosen from glass fibers, glass flakes and carbon fibers. The preferred glass fibers include the one manufactured using alkali glass, low alkali glass or alkali-free glass as a raw material and a shape thereof may be in any of roving, milled fibers and chopped strands. The diameter of such glass fibers is preferably 3 to 30 μm and the length thereof is preferably 1 to 6 mm. When the diameter of glass fibers is 3 μm or more, the PC resin composition becomes highly rigid, while when it is 30 μm or less, appearance of molded articles become good. The glass fibers to be kneaded with the resin components are preferably 0.01 to 2 mm long, preferably 0.05 to 1 mm long in pellets of the resin composition, since glass fibers fed to a kneader-extruder are broken during kneading with the resin components.

Preferably, the glass fibers, after treated with a surface treating agent, are further sized with a sizing agent in order to improve adhesiveness to the resin component, and then are blended with the resin mixture of above component (A), melted and kneaded. Such surface treating agents for the glass fibers include, for example, silane coupling agents such as aminosilanes, epoxysilanes, vinylsilanes, acryl silanes, and the like and other coupling agents such as titanates, aluminum based, chromium based, zirconium based and boron based coupling agents. Among them, silane and titanate coupling agents are particularly preferably used. A method for surface treatment may include a general aqueous solution method, an organic solvent method, a spray method, and the like. Sizing agents used after such surface treatment include those based on urethane, acryl, acrylonitrile-styrene copolymer, epoxy or other compounds. A method to size the glass fibers with the sizing agents thereof includes a known method such as dip coating, roller coating, blast coating, flow coating, spray coating, and the like.

The glass flakes can be manufactured from the raw material similar to that for the above glass fibers and similarly surface-treated. The size of the glass flakes is not particularly limited, but thickness thereof is preferably 3 to 30 μm, the value being similar to the diameter of the glass fibers. When dimensional precision of the molded articles is demanded, use of the glass flakes is preferred and use in combination with glass fibers or carbon fibers is preferred.

The carbon fibers preferably used include the one obtained by calcination of cellulose fibers, acrylic fibers, lignin, petroleum pitch or coal pitch as a raw material. There are such carbon fibers as flame resistant, carbonaceous and graphitic types depending on the calcination conditions, but any type of them may be used. The shape of the carbon fibers may be any one of roving, milled fibers and chopped strands. And the fiber diameter is preferably 5 to 15 μm and the fiber length is preferably in a range of 0.01 to 10 mm in pellets of the composition kneaded with the resin component. Furthermore, such carbon fibers are preferably surface-treated in advance with an epoxy or urethane resin to improve affinity to the resin component.

The blending volume of the nonmetallic inorganic fillers of component (B) is 4 to 50 parts by mass, preferably 10 to 40 parts by mass relative to 100 parts by mass of the resin mixture of component (A). When the volume is 4 parts by mass or more, rigidity and flame retardancy are improved, while when it is 50 parts by mass or less, the PC resin composition is good in flowability and yields molded articles with good appearance and good mechanical strength.

The phosphate compounds of component (C) used in the PC resin composition of the present invention preferably include phosphite esters and phosphate esters, which may be used singly or in a combination of two kinds or more. The phosphite esters include the one represented by the following general formula (8),

[Formula 7]

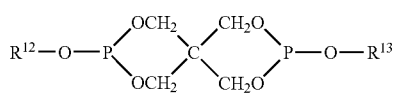
(8)

(wherein in the formula, $R^{12}$ and $R^{13}$ each represent a hydrogen atom, an alkyl group, a cycloalkyl group or an aryl group. Cycloalkyl and aryl groups may be substituted with alkyl group(s)). Specific examples can be illustrated with compounds of the following formulas (9) (Adekastab PEP-36 manufactured by Asahi Denka Co., Ltd.) and (10) to (13).

[Formula 8]

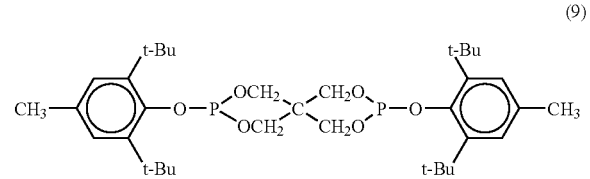
(9)

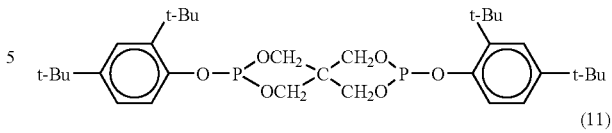
(10)

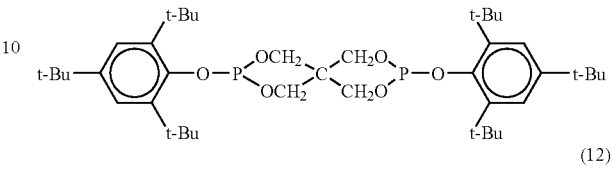
(11)

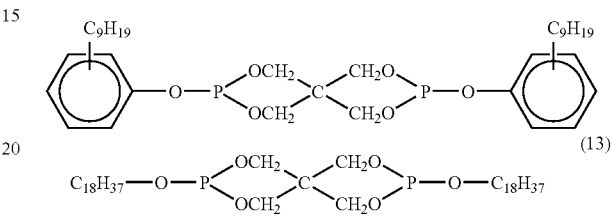
(12)

(13)

Phosphites other than the above examples can be further illustrated as tri(2,4-di-t-butylphenyl) phosphite, trinonylphenyl phosphite, triphenyl phosphite, tridecyl phosphite, trioctadecyl phosphite, and the like. A preferred phosphite ester includes the one having a pentaerythitol structure or alkyl ester structure.

Phosphate esters include the compounds represented by the following general formula (14),

[Formula 9]

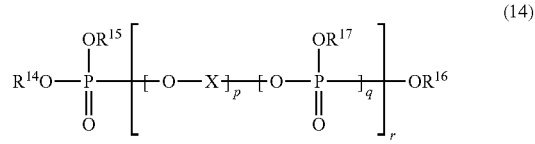
(14)

(wherein in the formula, $R^{14}$, $R^{15}$, $R^{16}$ and $R^{17}$ each represent independently a hydrogen atom or an organic group, X represents a divalent or higher valent organic group, p is 0 or 1, q is an integer of 1 or higher and r represents an integer of 0 or higher).

The organic group in the above general formula (14) refers to a substituted or unsubstituted alkyl, cycloalkyl, aryl group and others. Substituents in the substituted cases include an alkyl, alkoxy, aryl, aryloxy, arylthio group and others. Further, an arylalkoxyalkyl group, and the like, in which these substituents are combined and an arylsulfonyl aryl group, and the like, in which these substituents are combined by linking via an oxygen, nitrogen, sulfur atom, and the like may be also included.

Further, the divalent or higher valent organic group, X, in the above general formula (14) refers to a divalent or higher valent group formed by removing one or more hydrogen atoms bonded to a carbon, atom in the above organic group. The group includes, for example, an alkylene group, a (substituted) phenylene group and groups derived from bisphenols that are polynuclear phenols. Preferred examples include bisphenol A, hydroquinone, resorcinol, dihydroxydiphenyl, dihydroxynaphthalene, and the like.

The phosphate esters may be a monomer, oligomer, polymer or a mixture thereof. Specific examples include trimethyl phosphate, triethyl phosphate, tributyl phosphate, trioctyl phosphate, tributoxyethyl phosphate, triphenyl phosphate, tricresyl phosphate, cresyldiphenyl phosphate, octyldiphenyl phosphate, tri(2-ethylhexyl) phosphate, diisopropylphenyl phosphate, trixylenyl phosphate, tris(isopropylphenyl) phosphate, tributyl phosphate, bisphenol A bisphosphate, hydroquinone bisphosphate, resorcin bisphosphate, resorcinol diphenyl phosphate, trioxybenzene triphosphate, cresyldiphenyl phosphate, and the like. Monoalkyl/dialkyl phosphates are preferred as the phosphate ester.

Commercially-available halogen-free phosphate esters compounds preferably used include, for example. AX-71 [mono/dialkoxy phosphate] manufactured by Asahi Denka Co., Ltd. TPP [triphenyl phosphate], TXP [trixylenyl phosphate], PFR [resorcinol (diphenyl phosphate], PX200 [1,3-phenylene-tetrakis(2,6-dimethylphenyl) phosphate], PX201 [1,4-phenylene-tetrakis(2,6-dimethylphenyl) phosphate]. PX202 [4,4'-biphenylene-tetrakis(2,6-dimethylphenyl) phosphate] and the like manufactured by Daihachi Chemical Industry Co. Ltd.

The blending volume of the phosphate compound of component (C) is 0.01 to 1 part by mass, preferably 0.02 to 0.6 part by mass, more preferably 0.05 to 0.4 part by mass with respect to 100 parts by mass of the resin mixture of component (A). When the blending volume is 0.01 part by mass or more, the reaction of PC with polylactic acid and deterioration thereof can be prevented, resulting in no decrease of heat resistance, good flame retardancy and high mechanical strength. When the blending volume is 1 part by mass or less, its effectiveness is balanced well with economy.

To the PC resin composition of the present invention may be added polytetrafluoroethylene (PTFE), and the like to further increase flame retardancy and elastomers, and the like to improve impact strength as needed.

The PC resin composition of the present invention can be obtained by blending the above components of (a-1) and (a-2) with the components of (B), (C) and further other components as needed, melting and kneading.

Such blending and kneading are carried out by using conventional methods, for example, methods using ribbon blenders, Henschei mixers, Bambury mixers, drum tumblers, single screw extruders, twin screw extruders, cokneaders, multi-screw extruders, and the like.

The heating temperature during melting and kneading is generally chosen from a range of 220 to 260° C.

The present invention also provides molded articles comprising the above thermoplastic resin composition. The molding temperature for the thermoplastic resin, composition of the present invention is also generally chosen from a range of 240 to 320° C.

EXAMPLES

The present invention is now described in more detail with Examples, but not limited in any way by such Examples.

Preparation Example 1

PC-PDMS1; Preparation of PC-PDMS (Polydimethylsiloxane) Copolymer (1) Preparation of PC Oligomers A sodium hydroxide aqueous solution containing bisphenol A was prepared by dissolving 60 kg of bisphenol A in 400 L of 5% by mass sodium hydroxide aqueous solution. This sodium hydroxide aqueous solution containing bisphenol A kept at room temperature and methylene chloride were then fed at a flow rate of 138 L/hour and 69 L/hour, respectively, through an orifice plate into a tubular reactor with an inner diameter of 10 mm and a tube length of 10 m, to which phosgene was concurrently injected at a flow rate of 10.7 kg/hour to continuously react for three hours.

The tubular reactor used here was composed of a double-walled tube, in which cooling water was circulated through the jacket portion to keep the exit temperature of the reaction mixture at 25° C. The pH value of the effluent was adjusted at 10 to 11.

The reaction mixture thus obtained was allowed to stand to separate and remove the aqueous phase to collect a methylene chloride phase (220 L), yielding PC oligomers (concentration, 317 g/L). The degree of polymerization of the PC oligomers obtained was 2 to 4 and the concentration of the chloroformate group was 0.7 mol/L.

(2) Preparation of Reactive PDMS

A mixture of 1,483 g of octamethylcyclotetrasiloxane, 96 g of 1,1,3,3-tetramethyldisiloxane and 35 g of 86% by mass sulfuric acid was prepared and stirred at room temperature for 17 hours. The oil phase was then separated, to which 25 g of sodium hydrogencarbonate was added and the resultant mixture was stirred for 1 hour.

After filtration, the reaction mixture was vacuum-distilled at 150° C. and 3 Torr (400 Pa) to remove low boiling products to yield an oil. The oil weighing 294 g obtained as above was added at 90° C. to a mixture of 60 g of 2-allylphenol and platinum chloride-alcoholate complex equivalent to 0.0014 g of platinum. This mixture was stirred for 3 hours while keeping the temperature at 90 to 115° C.

The reaction product was extracted with methylene chloride and washed with 80% by mass aqueous methanol three times to remove excess 2-allylphenol. This product was dried over anhydrous sodium sulfate and the solvent was distilled off under vacuum to a temperature of 115° C.

The number of the dimethylsilanoxy recurring unit in the reactive PDMS with phenolic terminal groups obtained was determined by NMR measurements to be 30.

(3) Preparation of Polycarbonate-Polydimethylsiloxane Bisphenol A Polycarbonate Resin (PC-PDMS Copolymer)

An aliquot of the reactive PDMS weighing 138 g obtained above in (2) was dissolved in 2 L of methylene chloride, with which 10 L of the PC oligomers obtained above in (1) was mixed. To this mixture were added 26 g of sodium hydroxide dissolved in 1 L of water and 5.7 ml of triethylamine, and the resultant mixture was reacted while stirring at room temperature and 500 rpm for one hour.

After completing the reaction, a solution prepared by dissolving 600 g of bisphenol A in 5 L of 5.2% by mass sodium hydroxide aqueous solution, 8 L of methylene chloride and 96 g of p-tert-butylphenol were added to the above reaction system, and the resultant solution was reacted while stirring at room temperature and 500 rpm for 2 hours.

After completing the reaction, 5 L of methylene chloride was added to the reaction mixture, which was successively washed with 5 L of water, alkaline-washed with 5 L of 0.03 mol/L sodium hydroxide aqueous solution, acid-washed with 5 L of 0.2 mol/L hydrochloric acid and 5 L of water twice and finally methylene chloride was eliminated to yield a flaky PC-PDMS copolymer.

The PC-PDMS copolymer obtained was vacuum-dried at 120° C. for 24 hours. The viscosity average molecular weight was 17,000 and the PDMS content was 4.0% by mass. The PDMS content was determined by the following method.

Evaluation was based on the ratio of intensity in the methyl peak of isopropyl group in bisphenol A observed at 1.7 ppm and that in the methyl peak of dimethylsiloxane observed at 0.2 ppm in $^1$H-NMR.

Preparation Example 2

PC-PDMS2; Preparation of PC-PDMS Copolymer

A reactive PDMS was obtained similarly to Preparation example 1 (2) except that the amount of 1,1,3,3-tetramethyl-disiloxane in Preparation example 1 (2) was changed to 37.6 g. The number of dimethylsilanoxy recurring unit of the reactive PDMS was 120.

A PC-PDMS copolymer was obtained using this reactive PDMS similarly to Preparation example 1(3). By performing similar measurements as above, the viscosity average molecular weight of 17,000 and the PDMS content of 4.0% by mass were determined.

Preparation Example 3

PC-PDMS3; Preparation of PC-PDMS Copolymer

A reactive PDMS was obtained similarly to Preparation example 1(2) except that the amount of 1,3,3,3-tetramethyl-disiloxane in Preparation example 1(2) was changed to 18.1 g. The number of dimethylsilanoxy recurring unit of the reactive PDMS was 150.

A PC-PDMS copolymer was obtained using this reactive PDMS similarly to Preparation example 1(3). By performing similar measurements as above, the viscosity average molecular weight of 17,000 and the PDMS content of 4.0% by mass were determined.

Examples 1 to 14 and Comparative Examples 1 to 7

Each component in the proportion given in Table 1 was blended and fed to a vented twin screw extruder [TEM35 manufactured by Toshiba Machine Co., Ltd.] to melt and knead at 240° C. for pelletization. After the pellets obtained were dried at 80 to 120° C. for 5 hours, they were injection-molded at a molding temperature of 260° C. and a mold temperature of 80° C. to yield test specimens. The test specimens obtained were used to evaluate properties according to the following various evaluation tests. The results are shown in Table 1.

Blending components used and methods for property evaluation are given in the following.
[Blending Components]
Component (a-1)
PC: Aromatic polycarbonate resin, Tarflon A1900 [manufactured by Idemitsu Kosan Co., Ltd., viscosity average molecular weight=19,500].
PC-PDMS1: Viscosity average molecular weight=17,000, PDMS content=4.0% by mass, chain length of PDMS (n)=30 (refer to Preparation example 1).
PC-PDMS2: Viscosity average molecular weight=17,000, PDMS content=4.0% by mass, chain length of PDMS (n)=120 (refer to Preparation example 2).
PC-PDMS3: Viscosity average molecular weight=17,000, PDMS content=4.0% by mass, chain length of PDMS (n)=150 (refer to Preparation example 3).
Component (a-2)
PLA-1: Polylactic acid, Laysia H-400 [manufactured by Mitsui Chemicals. Inc., MFR for molecular weight (190° C. and 21.2N)=3].
PLA-2: Polylactic acid, Laysia H-100 [manufactured by Mitsui Chemicals. Inc., MFR for molecular weight (190° C. and 21.2N)=8].
PBT: Polybutylene terephthalate, Tufpet N1000 [manufactured by Mitsubishi Rayon Co. Ltd.].
Component (B)
GF: Glass fibers, MA 409C [manufactured by Asahi Fiberglass Co. Ltd. fiber diameter=12 μm, fiber length=13 mm].
Glass flakes: REFG 101 [manufactured by Nippon Sheet Glass Co., Ltd. average longer axis length=1400 μm].
CF: Carbon fibers, HTAC-6SRS [manufactured by Toho Rayon Co., Ltd., fiber diameter=6 μm, fiber length=13 mm].
Component (C)
Phosphate compound 1: Pentaerythritol type phosphite ester, Adekastab PEP-36[manufactured by Asahi Denka Co., Ltd.].
Phosphate compound 2: Phenoxy type phosphite ester, Irgafos 168 [manufactured by Chiba Specialty Chemicals Co., Ltd.].
Phosphate compound 3: Mono/dialkoxy type phosphate ester, AX-71 [manufactured by Asahi Denka Co., Ltd.].
[Method to Evaluate Physical Properties]
(1) Izod (Izod Impact Strength)
The specimen with a thickness of 3.18 mm was used to measure the Izod impact strength at 23° C. complying with ASTM D256. Unit is in kJ/m$^2$.
(2) Flexural Modulus
The specimen with a thickness of 4 mm was used to measure the flexural modulus at 23° C. complying with ASTM D790. Unit is in MPa.
(3) HDT (Heat Distortion Temperature)
The heat distortion temperature was measured under a load of 1.83 MPa complying with ASTM D648. Such values are indicative of heat resistance and preferably in a range of 100° C. or higher depending on the purpose of use with the resin composition. Unit is in ° C.
(4) Flowability (SFL)
Flowability was measured at a molding temperature of 260° C. and an injection pressure of 7.85 MPa using a mold with a thickness of 2 mm and a width of 10 mm at a mold temperature of 80° C. Unit is in cm.
(5) Appearance of Molded Articles
A piece was molded in a rectangular plate of 80×40×3 mm and visually inspected. Appearance was rated as "Good" for little uneven flow and "Poor" for uneven flow.
(6) Limiting Oxygen Index (LOI)
The limiting oxygen index was measured complying with ASTM D2863. Unit is in %.
(7) Flame Retardancy
A specimen with a thickness of 1.5 mm was used to perform a vertical burning test based on UL94 standard complying with Underwriters Laboratory Subject 94.

TABLE 1

| | | | | Example 1 | Example 2 | Example 3 | Example 4 | Example 5 | Example 6 | Example 7 |
|---|---|---|---|---|---|---|---|---|---|---|
| Blending | (A) | (a-1) | PC | 80 | 80 | | | | 40 | 72.5 |
| ratio | | | PC-PDMS1 | | | 80 | | | | |
| (parts by | | | PC-PDMS2 | | | | 80 | | 40 | 7.5 |
| mass) | | | PC-PDMS3 | | | | | 80 | | |

TABLE 1-continued

|  |  |  |  |  |  |  |  |  |  |
|---|---|---|---|---|---|---|---|---|---|
|  | (a-2) | PLA-1 | 20 | 20 | 20 | 20 | 20 | 20 | 20 |
|  |  | PLA-2 |  |  |  |  |  |  |  |
|  |  | PBT |  |  |  |  |  |  |  |
|  | (B) | GF | 20 | 20 | 20 | 20 | 20 | 20 | 20 |
|  |  | Glass Flakes |  |  |  |  |  |  |  |
|  |  | CF |  |  |  |  |  |  |  |
|  | (C) | Phosphate compound 1 | 0.3 |  | 0.3 | 0.3 | 0.3 | 0.3 | 0.3 |
|  |  | Phosphate compound 2 |  | 0.3 |  |  |  |  |  |
|  |  | Phosphate compound 3 |  |  |  |  |  |  |  |
| PMDS content in (A) (% by mass) |  |  | 0 | 0 | 3.2 | 3.2 | 3.2 | 2.0 | 0.3 |
| Evaluation | Izod impact strength (kJ/m$^2$) |  | 10 | 6 | 14 | 16 | 16 | 14 | 12 |
|  | Flexural modulus (MPa) |  | 6300 | 6300 | 6400 | 6400 | 6200 | 6400 | 6400 |
|  | HDT (under high load) |  | 130 | 121 | 128 | 126 | 124 | 128 | 128 |
|  | Flowability, SFL (cm) |  | 30 | 34 | 30 | 32 | 34 | 32 | 30 |
|  | Appearance of molded articles |  | Good | Good | Good | Good | Good | Good | Good |
|  | Limiting oxygen index, LOI (%) |  | 34 | 33 | 38 | 39 | 34 | 40 | 36 |
|  | Flame retardancy, UL 94, 1.5 mm |  | V-2 | V-2 | V-1 | V-1 | V-2 | V-0 | V-1 |

|  |  |  | Example 8 | Example 9 | Example 10 | Example 11 | Example 12 | Example 13 | Example 14 |
|---|---|---|---|---|---|---|---|---|---|
| Blending ratio (parts by mass) | (A) (a-1) | PC | 77.5 | 62 | 42 | 70 |  | 90 | 60 |
|  |  | PC-PDMS1 |  |  | 20 |  | 70 |  |  |
|  |  | PC-PDMS2 | 2.5 |  |  |  |  |  |  |
|  |  | PC-PDMS3 |  |  |  |  |  |  | 30 |
|  | (a-2) | PLA-1 | 20 |  |  | 30 | 30 |  |  |
|  |  | PLA-2 |  | 38 | 38 |  |  | 10 | 10 |
|  |  | PBT |  |  |  |  |  |  |  |
|  | (B) | GF | 20 | 20 | 20 | 50 | 50 |  |  |
|  |  | Glass Flakes |  | 10 | 10 |  |  |  |  |
|  |  | CF |  |  |  |  |  | 5 | 5 |
|  | (C) | Phosphate compound 1 | 0.3 | 0.1 | 0.1 | 0.3 | 0.3 | 0.2 | 0.2 |
|  |  | Phosphate compound 2 |  |  |  |  |  |  |  |
|  |  | Phosphate compound 3 |  | 0.2 | 0.2 |  |  |  |  |
| PMDS content in (A) (% by mass) |  |  | 0.1 | 0 | 0.8 | 0 | 1.2 | 0 | 1.2 |
| Evaluation | Izod impact strength (kJ/m$^2$) |  | 8 | 7 | 11 | 4 | 5 | 18 | 18 |
|  | Flexural modulus (MPa) |  | 6300 | 6600 | 6800 | 9500 | 10200 | 5400 | 5500 |
|  | HDT (under high load) |  | 122 | 118 | 120 | 132 | 131 | 137 | 138 |
|  | Flowability, SFL (cm) |  | 34 | 56 | 58 | 22 | 24 | 26 | 27 |
|  | Appearance of molded articles |  | Good | Good | Good | Poor | Poor | Good | Good |
|  | Limiting oxygen index, LOI (%) |  | 35 | 27 | 32 | 29 | 34 | 32 | 36 |
|  | Flame retardancy, UL 94, 1.5 mm |  | V-1 | V-2 | V-2 | V-2 | V-1 | V-1 | V-0 |

|  |  |  | Comparative example 1 | Comparative example 2 | Comparative example 3 | Comparative example 4 | Comparative example 5 | Comparative example 6 | Comparative example 7 |
|---|---|---|---|---|---|---|---|---|---|
| Blending ratio (parts by mass) | (A) (a-1) | PC | 98 | 15 | 80 | 80 | 80 | 80 |  |
|  |  | PC-PDMS1 |  |  |  |  |  |  | 30 |
|  |  | PC-PDMS2 |  |  |  |  |  |  |  |
|  |  | PC-PDMS3 |  |  |  |  |  |  |  |
|  | (a-2) | PLA-1 | 2 | 85 | 20 | 20 | 20 |  | 70 |
|  |  | PLA-2 |  |  |  |  |  |  |  |
|  |  | PBT |  |  |  |  |  | 20 |  |
|  | (B) | GF | 20 | 20 | 3 | 60 | 20 | 20 | 50 |
|  |  | Glass Flakes |  |  |  |  |  |  |  |
|  |  | CF |  |  |  |  |  |  |  |
|  | (C) | Phosphate compound 1 | 0.3 | 0.3 | 0.3 | 0.3 |  | 0.3 | 0.3 |
|  |  | Phosphate compound 2 |  |  |  |  |  |  |  |
|  |  | Phosphate compound 3 |  |  |  |  |  |  |  |
| PMDS content in (A) (% by mass) |  |  | 0 | 0 | 0 | 0 | 0 | 0 | 1.2 |
| Evaluation | Izod impact strength (kJ/m$^2$) |  | 12 | 1 | 8 | 5 | 5 | 6 | 5 |
|  | Flexural modulus (MPa) |  | 5700 | 6700 | 3100 | 11200 | 5800 | 5300 | 11300 |
|  | HDT (under high load) |  | 136 | 82 | 123 | 135 | 89 | 92 | 96 |
|  | Flowability, SFL (cm) |  | 15 | 90 | 35 | 16 | 45 | 17 | 57 |
|  | Appearance of molded articles |  | Flow mark | Good | Good | Flow mark | Good | Flow mark | Poor |
|  | Limiting oxygen index, LOI (%) |  | 35 | 25 | 28 | 32 | 29 | 28 | 30 |
|  | Flame retardancy, UL 94, 1.5 mm |  | V-2 | Unable to rate | V-2 | Unable to rate | Unable to rate | Unable to rate | V-2 |

The followings have become evident from Table 1. Comparative examples 1 to 6 are in contrast with Example 1.

(1) Examples 1 to 14

The PC resin compositions in Examples 1 to 14 have characteristics with good rigidity, high heat resistance and high flowability as well as a characteristic that forms molded articles with excellent appearance and flame retardancy. Comparison of Example 1 with Example 2 indicates that better heat resistance is obtained with the composition blended with the pentaerythrkol type phosphite ester than the one with the phenoxy type phosphite ester. Comparisons of Example 1 with Example 3, Example 1 with Example 4 and Example 11 with Example 12 indicate that the use of the PC-PDMS copolymer as a PC resin, particularly the PC-PDMS copolymer with a chain length of 30 to 120 gives further higher flame retardancy.

(2) Comparative Example 1

When the blending volume of polylactic acid is low, flowability is low and appearance of molded articles is poor.

(3) Comparative Example 2

When the blending volume of polylactic acid is excessive, flame retardancy and heat resistance are decreased, and impact strength is drastically reduced.

(4) Comparative Example 3

When the blending volume of glass fibers is low, rigidity is not improved and also flame retardancy is reduced.

(5) Comparative Example 4

When the blending volume of glass fibers is excessive, flowability is low and appearance of molded articles is poorer.

(6) Comparative Example 5

When phosphate compounds are not added as a component (c), both heat resistance and flame retardancy are substantially decreased.

(7) Comparative Example 6

When PBT that is an aromatic polyester is added instead of the aromatic PC resin, heat resistance, flame retardancy and flowability are low, and appearance of molded articles is poor. Improvement in rigidity is little.

INDUSTRIAL APPLICABILITY

The present invention can provide a PC resin composition with very high flowability, high heat resistance and high rigidity as well as excellent flame retardancy. The PC resin composition can be applied to electric and electronic equipment such as automated office equipment, information and communication equipment, home appliances, and the like, the automotive field, the building, construction field and others.

The invention claimed is:

1. A polycarbonate resin composition comprising 4 to 50 parts by mass of a nonmetallic inorganic filler (B) and 0.01 to 1 part by mass of a compound (C) relative to 100 parts by mass of a resin mixture (A) of 60 to 97% by mass of an aromatic polycarbonate resin (a-1) and 40 to 3% by mass of a fatty acid polyester (a-2), wherein the aromatic polycarbonate resin (a-1) is a polycarbonate-polyorganosiloxane copolymer comprising a polycarbonate section having a structural unit represented by general formula (5) and a polyorganosiloxane section having a structural unit represented by general formula (6):

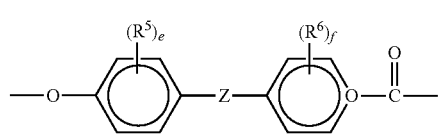

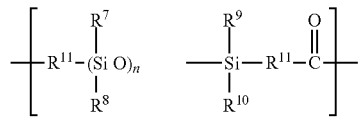

wherein $R^5$ and $R^6$ each represent a $C_1$-$C_6$ alkyl group or a phenyl group and are identical or different, $R^7$ to $R^{10}$ each represent a $C_1$-$C_6$ alkyl group or a phenyl group and are identical or different, $R^{11}$ represents a divalent organic residual group comprising an aliphatic or aromatic group, Z represents a single bond, a $C_1$-$C_{20}$ alkylene group or a $C_2$-$C_{20}$ alkylidene group, a $C_5$-$C_{20}$ cycloalkylene group or a $C_5$-$C_{20}$ cycloalkylidene group or a $SO_2$, SO, S, O, or CO bond, e and f each are an integer of 0 to 4, and n is an integer of 1 to 150, and having a terminal group represented by general formula (4):

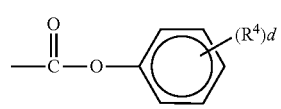

wherein $R^4$ represents a $C_1$-$C_{35}$ alkyl group and d represents an integer of 0 to 5,
wherein the resin mixture (A) has the polyorganosiloxane in an amount of 0.1 to 3.2% by mass; the nonmetallic inorganic filler (B) is a glass fiber, wherein the glass fiber diameter is 3 to 30 μm and the glass fiber length is 1 to 6 mm, and the glass fiber length after kneading in the polycarbonate resin composition is 0.01 to 2 mm; the compound (C) is at least one of a phosphite ester and a phosphate ester; and the fatty acid polyester (a-2) is a polylactic acid.

2. The polycarbonate resin composition according to claim 1, wherein the polycarbonate-polyorganosiloxane copolymer is a polycarbonate-polydimethylsiloxane copolymer having a chain length (n) of polydimethylsiloxane of 30 to 120.

3. The polycarbonate resin composition according to claim 2, wherein the polylactic acid has the weight average molecular weight of 30,000 or more.

4. The polycarbonate resin composition according to claim 3, wherein the polycarbonate resin composition has an Izod impact strength of 4 kJ/m² or higher, a flexural modulus of 5400 Mpa or higher, a heat distortion temperature of 118° C. or higher and a flowability of 22 cm or higher.

5. The polycarbonate resin composition according to claim 4, wherein the resin mixture (A) has the polydimethylsiloxane in an amount of 1.2 to 3.2% by mass.

6. An enclosure of electric and electronic equipment comprising the polycarbonate resin composition of claim 5.

7. A molded article comprising the polycarbonate resin composition of claim 5.

8. The polycarbonate resin composition according to claim 1, wherein the aromatic polycarbonate resin has a viscosity average molecular weight of from 10,000 to 40,000.

9. The polycarbonate resin composition according to claim 1, comprising the compound (C) in an amount of 0.02 to 0.6 part by mass with respect to 100 parts by mass of the resin mixture of component (A).

10. The polycarbonate resin composition according to claim 1, wherein the polyorganosiloxane has a reactive group selected from the group consisting of an o-allyphenol group, a p-hydroxystyrene group and an eugenol residual group.

* * * * *